United States Patent
Jenkins et al.

(10) Patent No.: US 12,311,770 B2
(45) Date of Patent: May 27, 2025

(54) SECURITY MODE FOR VEHICLE ONBOARD POWER SYSTEMS

(71) Applicant: Ford Global Technologies, LLC, Dearborn, MI (US)

(72) Inventors: Brendan Jenkins, Canton, MI (US); Daniel Sullivan, West Bloomfield, MI (US); Tyler James-Ray Kaldobsky, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 18/160,018

(22) Filed: Jan. 26, 2023

(65) Prior Publication Data

US 2024/0253466 A1   Aug. 1, 2024

(51) Int. Cl.
*B60L 1/00* (2006.01)
*B60W 10/26* (2006.01)

(52) U.S. Cl.
CPC .............. *B60L 1/006* (2013.01); *B60L 1/003* (2013.01); *B60W 10/26* (2013.01)

(58) Field of Classification Search
None
See application file for complete search history.

(56) References Cited

U.S. PATENT DOCUMENTS

| | | | | |
|---|---|---|---|---|
| 12,024,058 B2* | 7/2024 | Schleder | ................. | B60L 58/16 |
| 12,083,995 B1* | 9/2024 | Smith | .................... | H02K 11/33 |
| 2006/0164223 A1* | 7/2006 | Gilbert | .................... | H02J 9/002 |
| | | | | 307/10.6 |
| 2008/0306618 A1* | 12/2008 | Chiu | ....................... | B60R 11/02 |
| | | | | 700/94 |
| 2011/0185303 A1* | 7/2011 | Katagi | .................. | G06Q 10/06 |
| | | | | 715/771 |
| 2011/0288743 A1* | 11/2011 | Smith | ..................... | B60L 50/61 |
| | | | | 701/102 |
| 2012/0025842 A1* | 2/2012 | Gibbs | .................... | G01R 31/69 |
| | | | | 324/538 |
| 2014/0088827 A1* | 3/2014 | Yashiro | .................. | B60L 53/14 |
| | | | | 701/36 |
| 2014/0245160 A1* | 8/2014 | Bauer | .................... | G08C 17/02 |
| | | | | 715/736 |

(Continued)

FOREIGN PATENT DOCUMENTS

DE   102020108968 A1 * 10/2020   ............... B60K 6/26

OTHER PUBLICATIONS

Aaron Bragman, 5 Fun Facts About the 2021 F-150's Onboard Generator, Ford, PickupTrucks.com, Jun. 25, 2020, 1-7.

(Continued)

*Primary Examiner* — Justin S Lee
(74) *Attorney, Agent, or Firm* — Frank Lollo; Eversheds Sutherland (US) LLP (57) ABSTRACT

A vehicle onboard power (VOP) system is for a vehicle. The VOP system includes a power source, an outlet electrically connected to the power source, a processor electrically connected to the power source, and a memory. The memory has instructions that, when executed by the processor, cause the processor to perform operations including determining the vehicle is in an OFF state, detecting a change in a load profile associated with the outlet, and activating a vehicle alert response based on the change in the load profile.

18 Claims, 8 Drawing Sheets

(56) References Cited

U.S. PATENT DOCUMENTS

| | | | | |
|---|---|---|---|---|
| 2014/0351010 | A1* | 11/2014 | Kong | G06Q 30/0201 |
| | | | | 705/7.29 |
| 2015/0046352 | A1* | 2/2015 | Blitz | H04W 12/126 |
| | | | | 705/318 |
| 2015/0084411 | A1* | 3/2015 | Cho | H02J 1/14 |
| | | | | 307/10.1 |
| 2016/0161539 | A1* | 6/2016 | Kraft | G01R 22/066 |
| | | | | 324/110 |
| 2017/0151928 | A1* | 6/2017 | Kang | B60R 25/2045 |
| 2018/0072252 | A1 | 3/2018 | Collins | |
| 2019/0270387 | A1* | 9/2019 | Dudar | B60L 53/57 |
| 2019/0283731 | A1* | 9/2019 | Mazaira | B60W 50/085 |
| 2019/0329657 | A1 | 10/2019 | Caliskan et al. | |
| 2020/0108819 | A1* | 4/2020 | Revach | B60W 20/13 |
| 2020/0112163 | A1* | 4/2020 | Revach | H01H 71/70 |
| 2021/0197673 | A1 | 7/2021 | Espig et al. | |
| 2021/0197744 | A1 | 7/2021 | Ferrel et al. | |
| 2023/0015825 | A1* | 1/2023 | Jewkes | B60L 55/00 |

OTHER PUBLICATIONS

Jessica Shea Choksey, What is Ford Pro Power Onboard?, Ford, Feb. 16, 2021, 1-12.

\* cited by examiner

SECURITY MODE FOR VEHICLE ONBOARD POWER SYSTEMS

BACKGROUND

Vehicles, particularly utility and work vehicles, allow for the powering of AC accessories via, for example, 120 volt and 240 volt outlets located throughout a vehicle cabin, bed of a truck, and a vehicle frunk. Additionally, certain vehicles may operate such power systems while the ignition is off. This presents an inherent security concern. Specifically, with extended usage of such power systems, a third party may steal power from a given vehicle. Accordingly, it is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems, apparatuses, and methods disclosed herein assist at least in part in minimizing theft of power from vehicles, and also allowing power sources of vehicles to be controlled remotely. For example, vehicles in accordance with the disclosed concept may allow for powering of AC accessories, including fans, circular saws, refrigeration coolers, and the like, when ignitions of the vehicles are in an OFF state (e.g., and they may also do this when the ignition is in an ON state). They do this by employing vehicle onboard power (VOP) systems.

VOP systems of the disclosed vehicles have outlets which can provide power to the aforementioned AC accessories. Additionally, in a number of different scenarios, the VOP system of the vehicle is configured to guard against theft. For example, one scenario which may present as a theft is if a load is unplugged from an outlet and another load is plugged into the outlet. This may occur if a thief is attempting to syphon power from the vehicle to power the other load. In such a situation, a processor of the VOP system may determine the vehicle is in an OFF state, detect a change in a load profile associated with the outlet, and activate a vehicle alert response based on the change in the load profile.

The vehicle alert response may be programmed into the processor in a number of different ways depending on the desires of the user. For example, the response may include automatically moving a power source of the VOP system from an ON state to an OFF state in order to remove power from the outlet, upon detecting the change in the load profile. The response might include wirelessly monitoring the environment surrounding the vehicle with a telematics controller of the processor for a user device (e.g., a key fob, a mobile device, and a card-as-a-key). If the user device is detected (e.g., if the owner of the vehicle is nearby and has a key on his or her person), a powertrain controller of the processor can cause the power source to be maintained in an ON state.

However, if the user device is not detected by the telematics controller, the telematics controller could cause a wireless alert notification to be sent to a mobile device of the owner of the vehicle. In turn, the owner may in one example, send a signal to the telematics controller, which could cause the powertrain controller to move the power source from an ON state to an OFF state. This may be if there is a theft situation. In another example, the owner may send a signal to the telematics controller to maintain the power source in an ON state. This may be if the owner knows about and does not object to the power changes at the outlet.

In another example, the VOP system may be configured such that if the owner does not respond to the wireless alert notification on his or her mobile phone within a predetermined amount of time, the powertrain controller is to automatically move the power source from the ON state to the OFF state to remove power from the outlet. Additionally, in another example, the processor of the VOP system may be configured such that if the power to be drawn through the outlet is above a threshold or below a threshold, the powertrain controller is to automatically move the power source to the OFF state to remove power from the outlet. This may be when the owner knows how much power his or her device is to draw, and can thus guard against changes based on that assessment. In yet a further example, the VOP system may also include a and interface, such as a keypad, electrically connected to the processor that allows individuals to override the aforementioned security features. For example, if a steady state or transient load changes at the outlet, an individual may input a security code, say a verbal code, or make a gesture, at the interface in order to maintain the power source in an ON state, and thus continue to draw power. This may be done without the presence of the user device.

Moreover, it is also contemplated that the disclosed VOP system may allow a user to remotely energize and power on a power source, thereby allowing a load to be powered remotely. For example, if lights are connected to the outlet, a user may send a signal from a remote location to the processor of the VOP system with a mobile phone, thus allowing the lights to be turned on without the user having to be directly at the vehicle.

These and other advantages of the present disclosure are provided in greater detail herein.

Illustrative Embodiments

Figure 1:
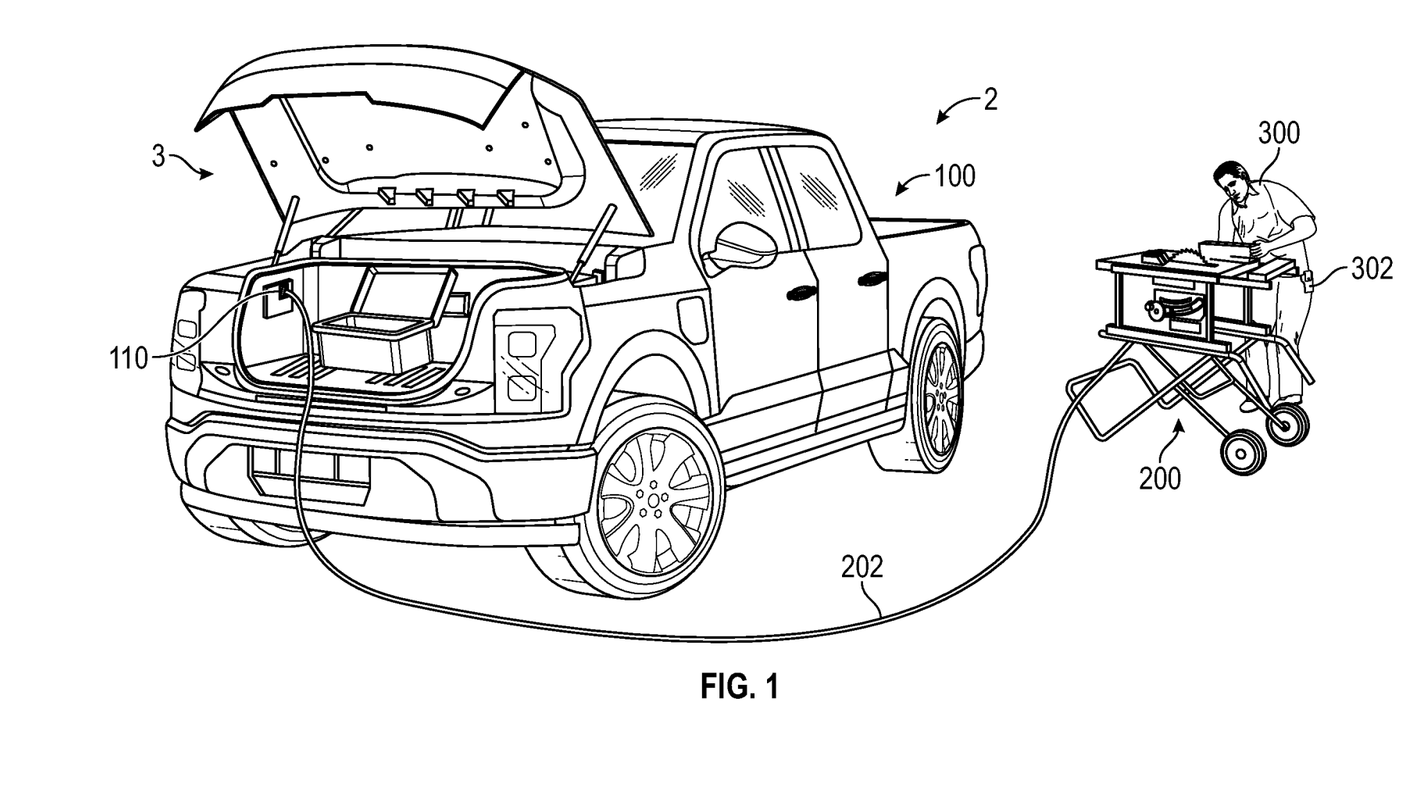
FIG. 1 is an isometric view of a vehicle with a vehicle onboard power (VOP) system therefor, shown as employed with a circular saw electrically connected to an outlet of the vehicle and a man using the circular saw, in accordance with one non-limiting embodiment of the disclosed concept.
Figure 2:
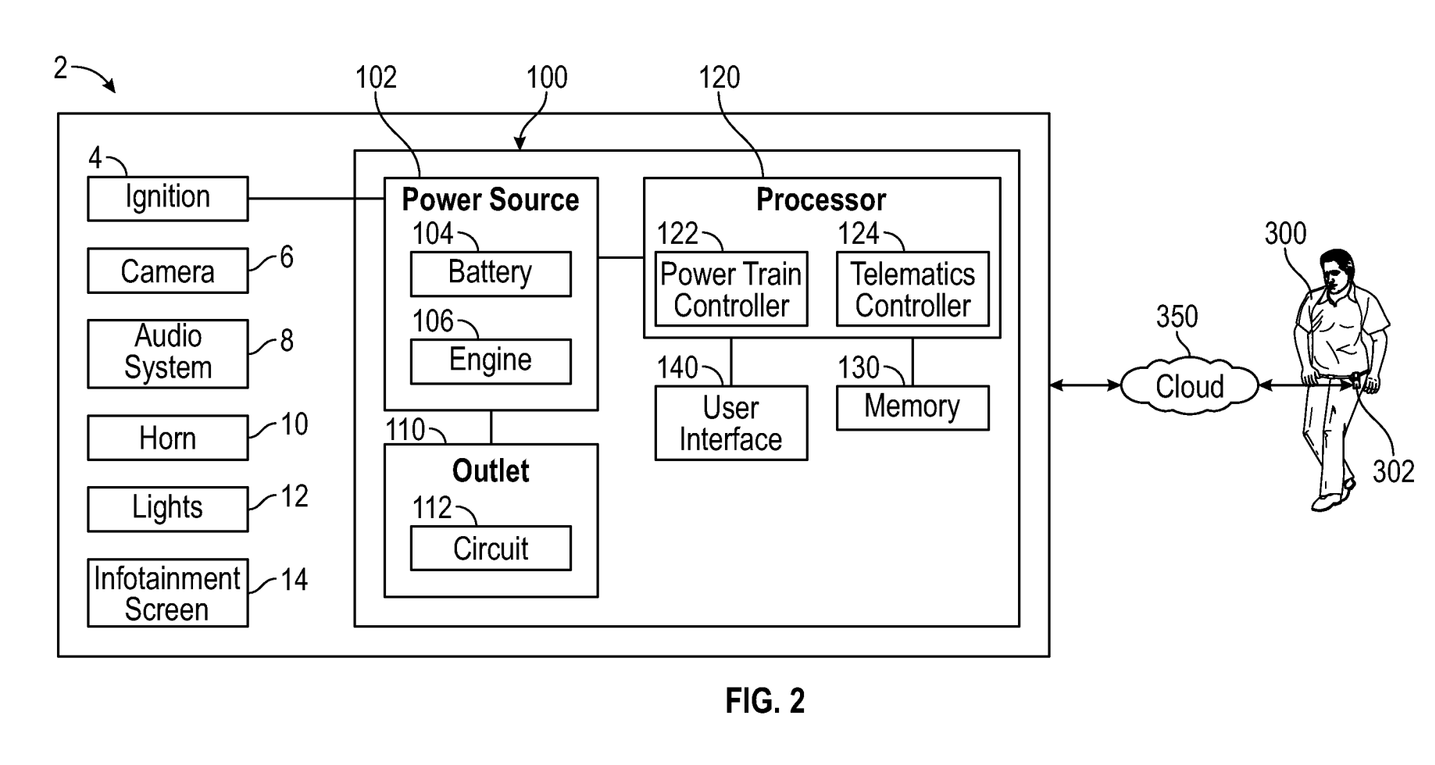
FIG. 2 is simplified view of the vehicle and VOP system therefor of FIG. 1, and is shown with a mobile phone of the man connected to the vehicle via a cloud.

FIG. 1 shows a vehicle 2 and vehicle onboard power (VOP) system 100 therefor, and FIG. 2 shows a simplified view of the vehicle 2 and VOP system 100 therefor, in accordance with one non-limiting embodiment of the disclosed concept. In one example, the VOP system 100 is a Pro Power Onboard system manufactured by Ford Motor Company of Dearborn, Michigan. Although the vehicle 2 in FIG. 1 and FIG. 2 is a truck, it will be appreciated that suitable alternative vehicles in accordance with the disclosed concept may take the form of a passenger or commercial automobile such as, for example, a performance vehicle, a car, a crossover vehicle, a sport utility vehicle, a van, a minivan, a taxi, a bus, etc., and may be configured and/or programmed to include various types of automotive drive systems. Additionally, in one example embodiment, the vehicle 2 may be configured as an electric vehicle (EV) or a hybrid vehicle.

More particularly, the vehicle 2 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or super capacitor banks for power storage, flywheel power storage systems, or other power generation and storage infrastructure. The vehicle 2 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 2 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Figure 7A:
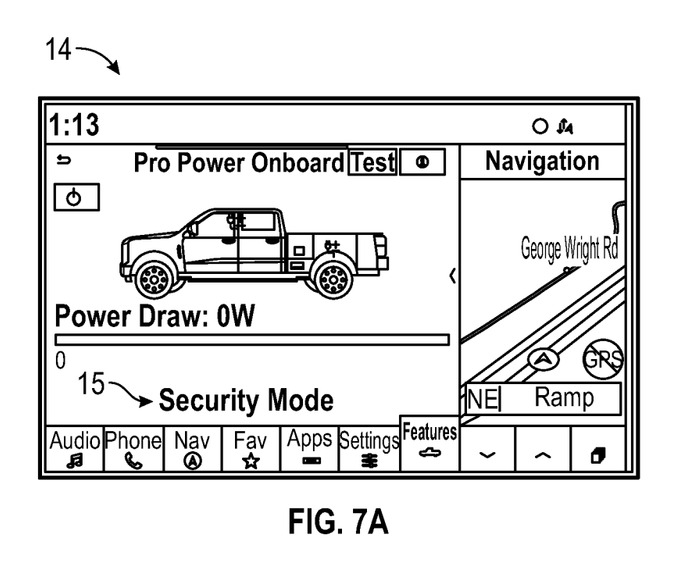
FIGS. 7A and 7B show an infotainment screen of the vehicle of FIG. 5, and show the infotainment screen with a security mode button not selected and selected, respectively.
Figure 7B:
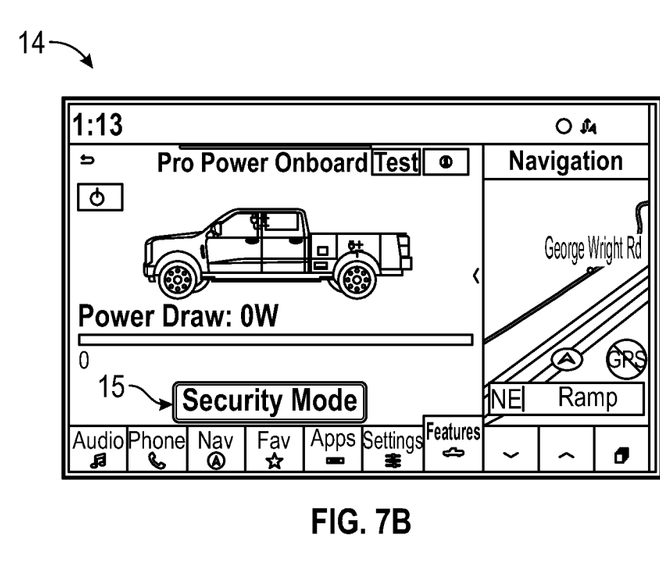

As shown in FIG. 2, the vehicle 2 further includes an ignition 4, a camera 6, an audio system 8, a horn 10, lights 12, and an infotainment screen 14 (see also FIGS. 7A and 7B). The ignition 4 may be a starter for an electric engine, a combustion engine, or a hybrid thereof. The VOP system 100 includes a power source 102 coupled to the ignition 4, an outlet 110 electrically connected to the power source 102, a processor 120 electrically connected to the power source 102, and a memory 130. The memory 130 of the vehicle 2 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.). Additionally, in the example of FIGS. 1 and 2, the outlet 110 is shown as employed in a frunk 3 of the vehicle 2. It will, however, be appreciated that the VOP system 100 is configured to be employed with outlets in other locations of the vehicle 2 (e.g., without limitation, a bed of the vehicle 2 and those located throughout a cabin of the vehicle 2).

The VOP system 100 is configured to provide power to AC accessories. For example, as shown in FIG. 1, a man 300 is using a circular saw 200, which is electrically connected to the vehicle 2. As will be discussed below, the VOP system 100 is configured to guard against undesirable theft of power of the vehicle 2. Furthermore, the VOP system 100 is configured to power AC accessories and also guard against theft with the ignition 4, and thus the vehicle 2, is in an OFF state (e.g., the ignition 4 is configured to move between an ON state and an OFF state).

In one example, the vehicle 2 and ignition 4 therefor may be in an OFF state in a number of different scenarios. For example, if the vehicle 2 is a vehicle requiring a traditional key to start, the vehicle 2 and ignition 4 therefor being in an OFF state may occur when the traditional key is not in the ignition and/or when the key is in the ignition 4, but the ignition has not been ignited—e.g., when the key has been turned an insufficient number of clicks and the engine has not been ignited on. Alternatively, if the vehicle 2 and ignition 4 therefor require, for example, a wireless key and start button (e.g., where pushing a vehicle brake, and then pressing the start button in proximity with the key gets the vehicle 2 in a torque producing state), the vehicle 2 and ignition 4 therefor being in an OFF state may include the brake not being pushed and/or the start button not being pressed with the key in a predetermined proximity to the start button, and may also include the key not being in predetermined proximity to the start button at all. The vehicle 2 and ignition 4 therefor being in an OFF state may also include a key not being within a predetermined distance from the vehicle 2.

Continuing to refer to FIG. 2, the power source 102, which may be at least one of a battery 104 and an engine 106, is configured to move between an ON state and an OFF state. Additionally, the outlet 110 is associated with a circuit 112 configured to have a load profile. The load profile may be one of a steady state load profile (e.g., a constant fan) or a transient load profile (e.g., a refrigeration unit). Additionally, the processor 120 of the VOP system 100 is advantageously configured via a control algorithm to learn the transient load profiles associated with a given load, and also to identify steady state versus transient loads.

For example, a cable 202 electrically connects the circular saw 200 to the outlet 110 such that when the circular saw 200 is drawing power from the power source 102 through the outlet 110, the circuit 112 has a load profile corresponding to the circular saw 200. The processor 120 thus may detect when there is a change in plug status (e.g., something is unplugged from the outlet 110 and/or something is plugged into the outlet 110) and detect changes in associated load profiles.

Figure 3:
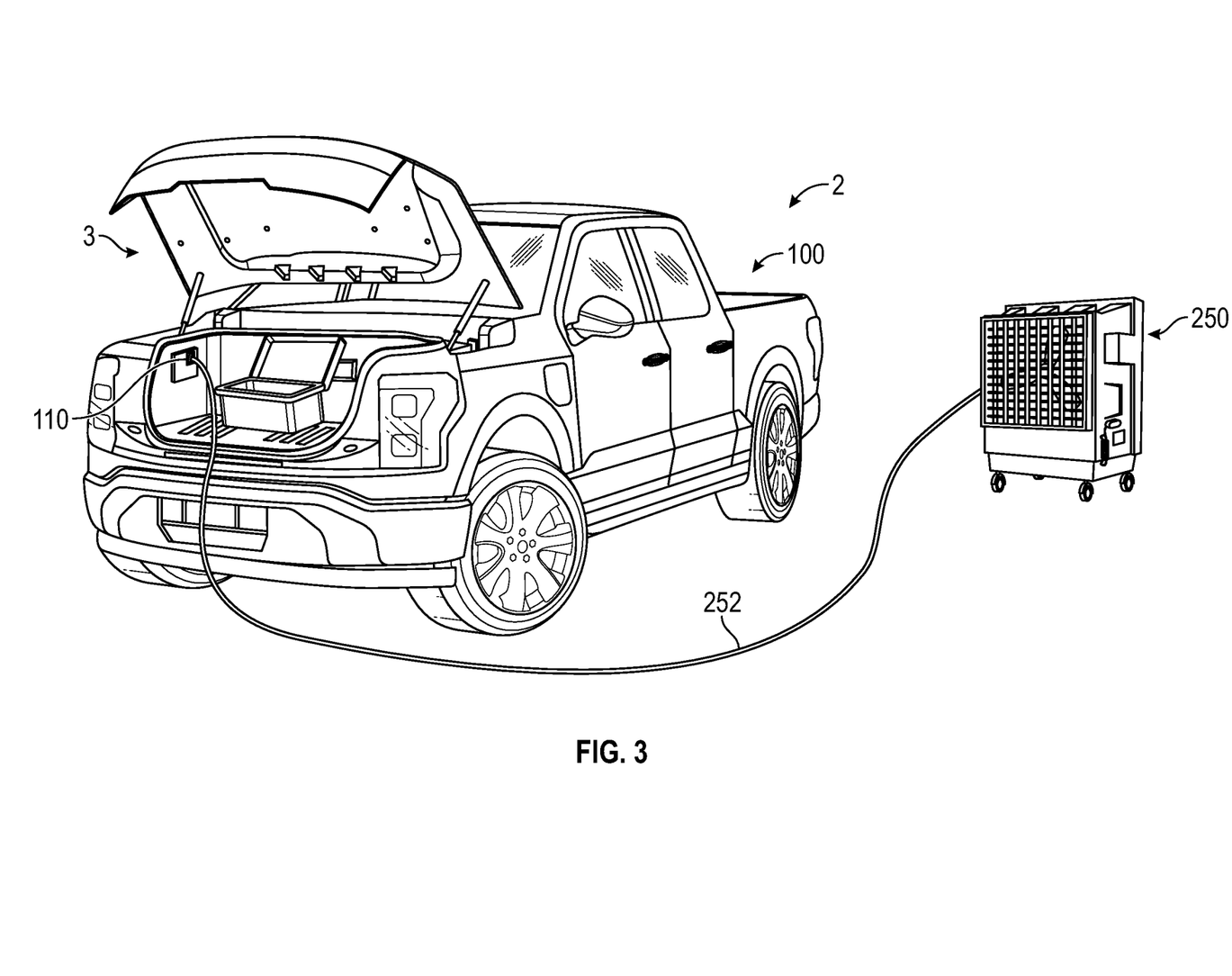
FIG. 3 is an isometric view of the vehicle and VOP system therefor of FIG. 1, and is shown with a refrigeration cooler electrically connected to the outlet instead of the circular saw.
Figure 4:
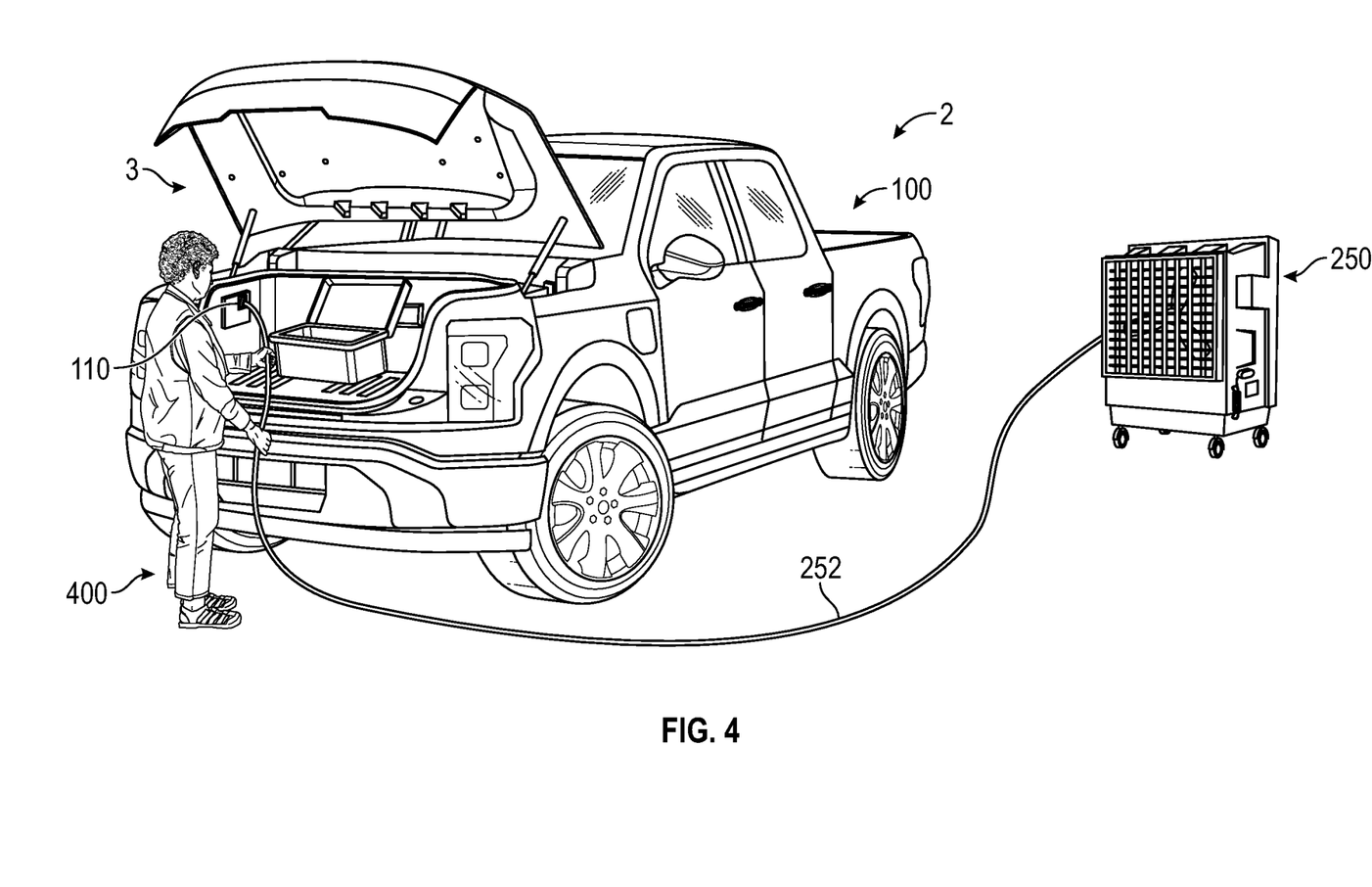
FIG. 4 shows the vehicle and VOP system therefor of FIG. 3, and is shown with another man grasping a cable connected to the refrigeration cooler.
Figure 5:
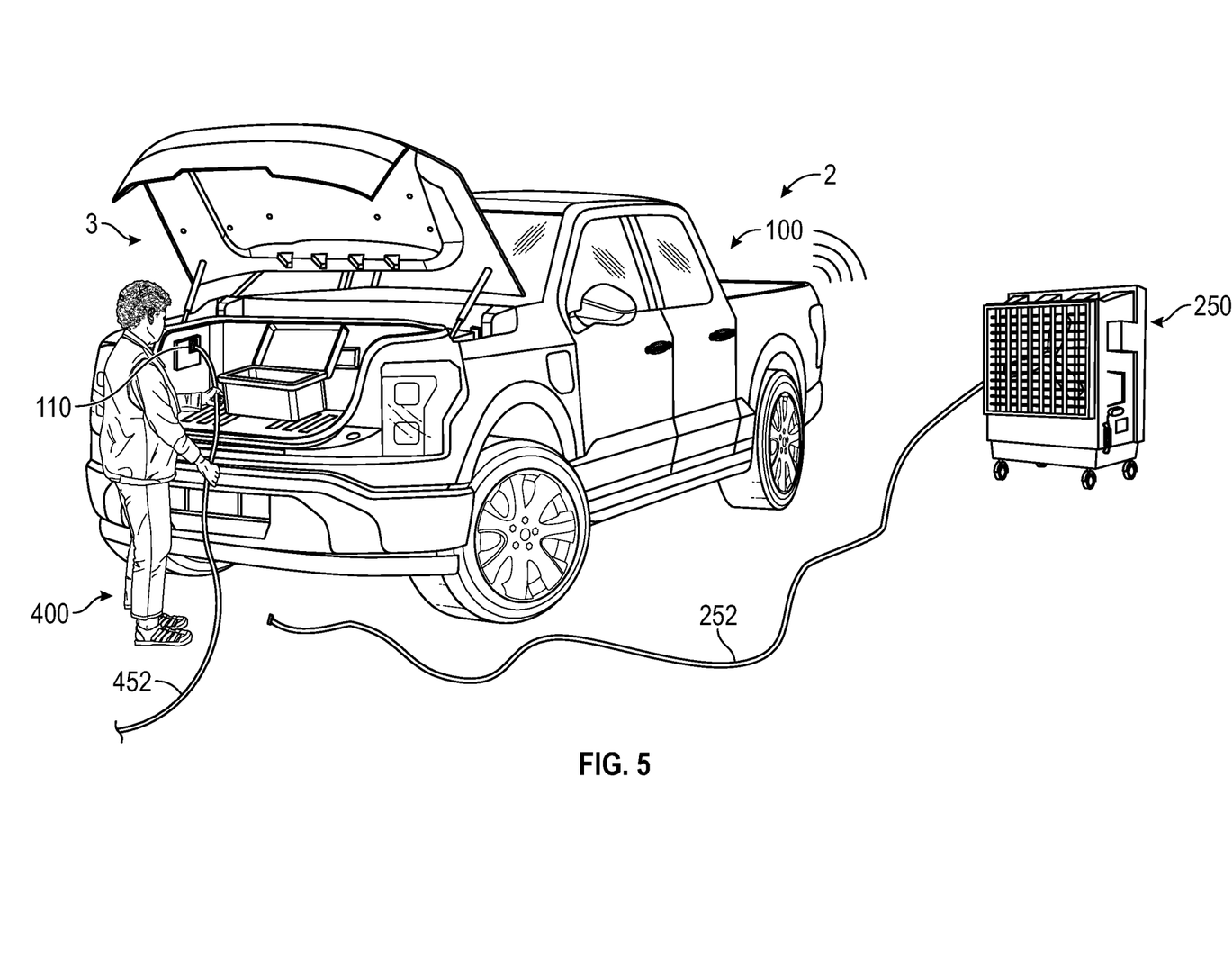
FIG. 5 shows the vehicle and VOP system therefor of FIG. 4, and is shown with the other man holding a different cable that is plugged into the outlet.

Accordingly, in accordance with the disclosed concept, the memory 130 has instructions that, when executed by the processor 120, cause the processor 120 to perform operations including determining the vehicle 2 is in an OFF state, detecting a change in a load profile associated with the outlet 110, and activating a vehicle alert response based on the change in the load profile. Reference will now be made to FIGS. 3-5 for an example use case of the VOP system 100.

As shown in FIG. 3, another AC accessory in the form of a refrigeration cooler 250 is electrically connected to the outlet 110 via a cable 252. It can also be seen in FIG. 3 that no individuals are standing near the vehicle 2. This may happen in a number of different situations, including for example, when the man 300 (FIG. 1 and FIG. 2) has left the vehicle unattended.

FIGS. 4 and 5 show an exemplary situation where the vehicle 2 and VOP system 100 therefor are configured to guard against theft of power. As shown in FIG. 4, another man 400 is grasping the cable 252 and is attempting to remove it from the outlet 110. Further yet, in FIG. 5 the cable 252 of the refrigeration cooler 250 has been disconnected from the outlet 110, and the man 400 has electrically connected another cable 452 to the outlet. This may be an example of a theft situation that may be guarded against by the example VOP system 100.

More specifically, the processor 120 (FIG. 2) of the VOP system 100 includes a powertrain controller 122 and a telematics controller 124 electrically connected to the powertrain controller 122. The powertrain controller 122 may be configured to control a powertrain of the vehicle 2, which may be either electric, internal combustion, or a hybrid thereof. In one example embodiment, the powertrain controller 122 is configured to move the power source 102 between the ON state and the OFF state, and the telematics controller 124 is configured to wirelessly communicate with a mobile device (e.g., without limitation, mobile phone 302) of the man 300. See FIG. 2, for example, which shows the mobile phone 302 wirelessly connected to the processor 120 of the vehicle 2 via a cloud 350. It will thus be appreciated that the man 300 may remotely control the VOP system 100 with the mobile phone 302, even when positioned great distances away from the vehicle 2.

Therefore, in the example of FIGS. 4 and 5, where the other man 400 is unplugging the cable 252 and plugging in the cable 452, the load profile of the circuit 112 will change from a first state corresponding to the refrigeration cooler 250, to a second state corresponding to no load (e.g., when the cable 252 is removed), to a third state corresponding to the load associated with the cable 452. Accordingly, the change in load profile of the circuit 112 may be caused by either a detection of a first load (e.g., a load connected to the cable 452) being connected to the outlet 110 or a detection of a second load (e.g., the refrigeration cooler 250) being disconnected from the outlet 110. When this is done, the VOP system 100 may take security measures.

For example, a vehicle alert response initiated by the telematics controller 124 of the processor 120 may include wirelessly monitoring an environment surrounding the vehicle 2 for the presence of a user device (e.g., without limitation, a key fob, a mobile device, or a card-as-a-key). If the telematics controller 124 detects the presence of the user device, the telematics controller 124 may maintain the power source 102 in an ON state. This is advantageous in situations where, for example, an owner of the vehicle 2 is near the vehicle 2 and is either connecting or disconnecting different loads to and from the outlet 110, but has a key on his or her person in order to override security features associated with the VOP system 100.

However, the vehicle alert response may also include sending a wireless alert notification (e.g., a pop-up) to the mobile phone 302 (e.g., or any other wirelessly connected device) if the user device (e.g., the key fob) is not detected. This may be performed with the telematics controller 124, which may first scan for the user device (e.g., the card-as-a-key), and then send the wireless alert notification to the mobile phone 302 if the user device is not detected. Alternatively, the telematics controller 124 may directly send a wireless alert notification to the mobile phone 302 if the load profile of the circuit 112 changes, either via the cable 252 being unplugged from the outlet 110 or via the cable 452 being plugged into the outlet 110.

Additionally, the processor 120 of the VOP system 100 may be configured to respond differently if a steady state load changes versus if the processor 120 detects that the cable 252 is unplugged from the outlet 110. For example, if the processor 120 determines that there has been a steady state load change, the processor 120 may maintain the power source 102 in an ON state. Moreover, as discussed above, if the cable 252 is unplugged from the outlet 110, the power source 102 may automatically be moved from the ON state to the OFF state to remove power to the outlet 110.

Figure 6:
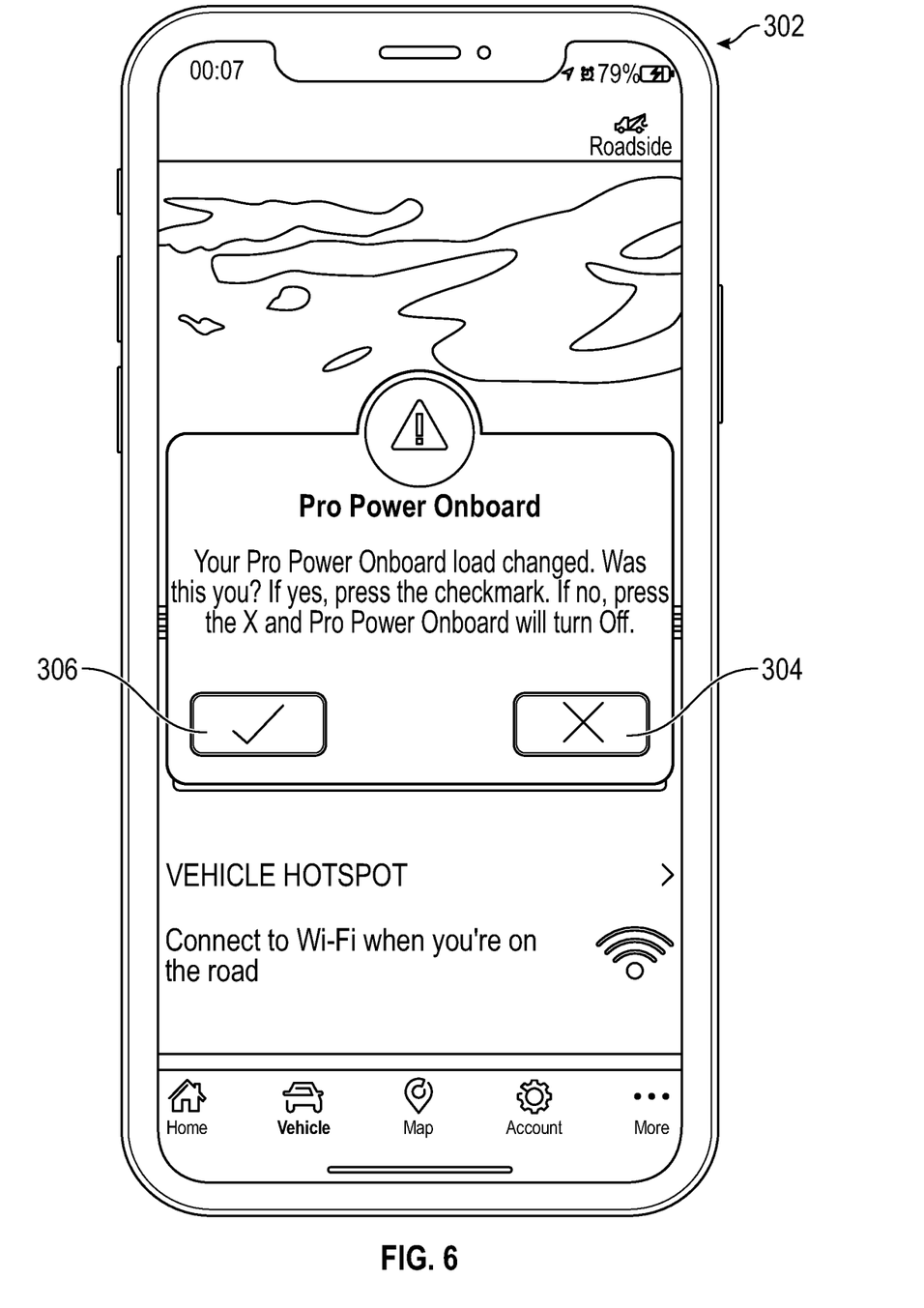
FIG. 6 shows an example screen shot of a mobile phone after receiving a wireless alert notification from the VOP system of FIG. 5.

By sending an alert notification from the telematics controller 124 of the processor 120 to the mobile phone 302, the man 300 is advantageously able to control the VOP system 100 remotely. FIG. 6 shows an example screen shot of the mobile phone 302 displaying the wireless alert notification from the telematics controller 124. Accordingly, the man 300 (FIGS. 1 and 2) will have an opportunity to disable the VOP system 100 if the wireless alert notification signals that a theft is occurring. For example, if the other man 400 from FIGS. 4 and 5 was the cause of the wireless alert notification being sent (e.g., by undesirably unplugging the cable 252 and plugging in the cable 452 (e.g., to steal power for the load connected to the cable 452)), then the man 300 (FIGS. 1 and 2) can select a button 304 on the mobile phone 302. In alternative embodiments, the notification alert may be provided in an audible format, such as an audible indicator such as a ringtone, or a preset audible message, and the input may be received in an audible format, such as an utterance.

By selecting the button 304, a wireless shut off signal will be sent to the telematics controller 124, which in turn will cause the powertrain controller 122 to move the power source 102 from an ON state to an OFF state, and thus shut off power at the outlet 110. Accordingly, the memory 130

(FIG. 2) may further include instructions that, when executed by the processor 120, cause the processor 120 to perform operations including receiving a shut off signal from the mobile phone 302, and moving the power source 102 from the ON state to the OFF state responsive to the shut off signal.

Alternatively, if the man 300 from FIGS. 1 and 2, e.g., the owner of the vehicle 2, knows ahead of time (e.g., the other man 400 called the man 300 and told him what he was going to do) that the other man 400 was going to unplug the cable 252 and plug in the cable 452 associated with another load (not shown), the man 300 can allow this to happen remotely. More specifically, and referring again to FIG. 6, if the man selects another button 306 responsive to the wireless alert notification, then the power source 102 (FIG. 2) may continue to remain in an ON state. This advantageously allows the man 300 to override the security features associated with the VOP system 100.

Further yet, the VOP system 100 may also shut off power even if the man 300 has not selected either of the buttons 304, 306. In such a situation, the memory 130 may further include instructions that, when executed by the processor 120, cause the processor 120 to perform operations including determining whether a disregard signal has been received from the mobile phone 302 within a predetermined amount of time, and moving the power source 102 from the ON state to the OFF state if the disregard signal has not been received from the mobile phone 302 within the predetermined amount of time. As such, the vehicle 2 and VOP system 100 therefor are configurable for what happens if the man 300 does not respond with a predetermined amount of time. This may further secure the vehicle 2 against undesirable theft of power.

Additionally, and continuing to refer to FIG. 2, the VOP system 100 further includes a user interface 140 electrically connected to the processor 120 and configured to maintain the power source in an ON state when the user device is not detected. The user interface 140 may include a display, touch screen, keypad, microphone, speaker, and/or a camera. In such a situation, if the owner of the vehicle 2, e.g., the man 300 (FIGS. 1 and 2), has given consent to the other man 400 (FIGS. 4 and 5), e.g., a non-theft situation, then the other man 400 can simply type in a predetermined code into the user interface 140 when unplugging the cable 252 and plugging in the cable 452. Such a situation could allow multiple people to use the VOP system 100 with the consent of the owner of the vehicle 2, or could otherwise allow the power source 102 to be maintained in an ON state when a key is not detected. These people can thus temporarily override the security features associated with the VOP system 100, thereby allowing users to modify steady state loads without a key on hand.

In another example embodiment, activating the vehicle alert response by the processor 120 may include automatically moving the power source 102 from the ON state to the OFF state, upon detecting the change in the load profile. This may present when the owner of the vehicle 2 (e.g., the man 300) leaves the vehicle 2 unattended, and for security reasons, configures the VOP system 100 such that any change in the load profile of the circuit 112 should cause the power source 102 to move from the ON state to the OFF state. Accordingly, when the other man 400 (FIGS. 4 and 5) unplugs the cable 252, the powertrain controller 122 in such an embodiment is configured to automatically move the power source from the ON state to the OFF state in order to remove power from the outlet 110.

In a further example embodiment, activating the vehicle alert response may include automatically moving the power source from the ON state to the OFF state after a predetermined amount of time. The VOP system 100 may thus be configured such that when the other man 400 (FIGS. 4 and 5) unplugs the cable 252 and there is a change in load profile, after a predetermined amount of time the powertrain controller 122 causes the power source 102 to automatically move from an ON state to an OFF state. Alternatively, the man 300 may leave the vehicle 2 and configure the processor 120 such that the power source 102 automatically moves to an OFF state after a predetermined amount of time, regardless of any changes in load profile. The VOP system 100 may also be configured to power down after a time threshold has passed. In such a situation, the man 300 can configure the processor 120 via an app on the mobile phone 302 such that after a predetermined amount of time has passed, the power source 102 may move from the ON state to the OFF state.

Moreover, activating the vehicle alert response includes either sending a wireless alert notification to the mobile phone 302 corresponding to the change in the load profile, or moving the power source 102 from the ON state to the OFF state. Activating the vehicle alert response may also include sending a wireless alert notification to the mobile phone 302 if the load profile of the circuit 112 has a value that exceeds a first predetermined power threshold or falls below a second predetermined power threshold. This situation may also allow tampering of the VOP system 100 to be minimized. For example, if the man 300 knows that 1,000 watts of power are being drawn, he can configure the VOP system 100 such that if the VOP system 100 were to draw, for example, 1,200 watts of power, the powertrain controller 122 should automatically (or not automatically—e.g., an alert could be sent to the mobile phone 302 prompting action) move the power source 102 from the ON state to the OFF state. It will thus be appreciated that any number and/or combination of the aforementioned responses may be included with the vehicle alert response when a change in load profile and/or plugging in of a cable is detected by the processor 120.

In addition to the aforementioned advantages associated with the vehicle 2 and VOP system 100 therefor, the vehicle 2 is further configured to guard against theft. More specifically, the camera 6, the audio system 8, the horn 10, and the lights 12 are each electrically connected to the processor 120, and activating the vehicle alert response includes employing at least one of the camera 6, the audio system 8, the horn 10, and the lights 12. This may present as, for example, the camera 6 taking footage of the surrounding environment (e.g., to better lead to apprehension of a thief), the audio system 8 playing a message (e.g., "STEP AWAY FROM THE VEHICLE"), the horn 10 sounding, and/or the lights 12 flashing. Any of the aforementioned may happen automatically (e.g., responsive to a change in the load profile), via remote control from the man 300 at a remote location, or otherwise as discussed herein.

In yet another example, the man 300 (FIGS. 1 and 2) may remotely control the VOP system 100 with the mobile phone 302 in order to energize a load (e.g., the refrigeration cooler 250 (FIG. 3)). For example, if the man 300 were spaced many miles from the vehicle 2 and needed to power the refrigeration cooler 250 (FIG. 3), the man could simply send a signal from the mobile phone 302 to the powertrain controller 122 in order to cause the power source 102 to be moved from an OFF state to an ON state in order to deliver power to the outlet 110.

In accordance with the disclosed concept, a method may include providing a vehicle 2 comprising an ignition 4 and a vehicle onboard power (VOP) system 100, the VOP system 100 comprising a power source 102 and an outlet 110, the power source 102 being coupled to the ignition 4 and configured to move between an ON state and an OFF state, the outlet 110 being electrically connected to the power source 102; associating the outlet 110 with a circuit 112 configured to have a load profile; and either moving the power source 102 from the OFF state to the ON state responsive to a signal being sent to the processor 120 from a mobile device (e.g., without limitation mobile phone 302) in order to deliver power to the outlet 110, or detecting a change in the load profile and activating a vehicle alert response based on the change in the load profile. The method may also include moving the power source 102 from the OFF state to the ON state with the ignition 4 in the OFF state, responsive to the signal being sent to the processor 120 from the mobile phone 302 in order to deliver power to the outlet 110.

FIGS. 7A and 7B show two different views of user interfaces for the infotainment screen 14 of the vehicle 2. As shown, the infotainment screen 14 may have a security mode button 15, which is electrically connected to the processor 120 (FIG. 2). In the example of FIG. 7A, the security mode button 15 is not selected (e.g., the security mode is off), and in FIG. 7B, the security mode button 15 is selected (e.g., the security mode is on, that is, activated). In one example embodiment, when an individual activates the security mode button 15, the processor 120 of the VOP system 100 is configured to, for example and without limitation, detect changes in load profiles of the circuit 112, send wireless alert notifications, receive signals from the mobile phone 302, and move the power source 102 between ON and OFF states.

Figure 8:
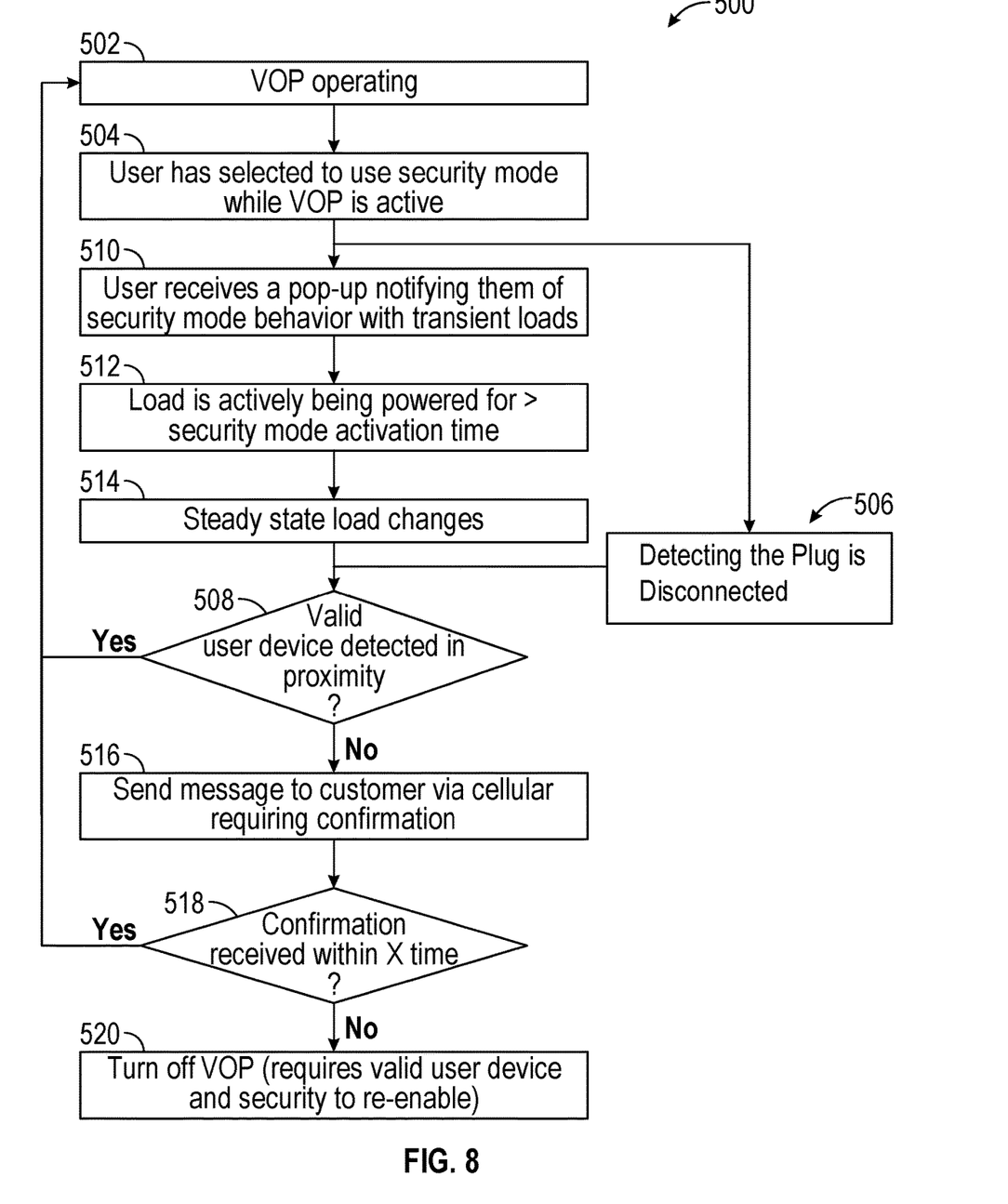
FIG. 8 is an example flow chart corresponding to operation of the vehicle and VOP system therefor of FIG. 5.

FIG. 8 is an example flow method 500 corresponding to operation of the vehicle 2, VOP system 100 therefor, and associated method. In one example, a first step 502 includes the VOP system 100 operating and a second step 504 may present when a user has selected to use security mode while the VOP system 100 is operating. Different other steps can lead to alternative operations of the disclosed method. For example, if a plug is then disconnected at the outlet 110 at a step 506, then the method 500 may include a step 508 of determining if a valid user device is in proximity to the vehicle 2. Alternatively, the method 500 may include a step 510 wherein a user receives a pop-up notifying them of security mode behavior with transient loads, another step 512 wherein a load is actively being powered for greater than a security mode activation time, and a step 514 of determining if there are steady state load changes. After the step 514, the method 500 may again include the step 508 of determining if the valid user device is in proximity to the vehicle. After the step 508, if the user device is in proximity to the vehicle 2, the method can begin again at step 502. However, if the user device is not in proximity to the vehicle 2 (e.g., a potential security concern), the method 500 can include a step 516 of sending a message to a customer via cellular networks which requires confirmation. Subsequently, the method 500 includes a step 518 of determining whether confirmation is received within a predetermined amount of time. If confirmation is received in time, the method 500 resumes at step 502. However, if confirmation is not received in time, the method 500 may include a step 520 of turning off the VOP system, which may require a valid user device and security to re-enable.

Accordingly, it will be appreciated that the disclosed concept provides for a new (e.g., without limitation, better protected against theft and able to remotely operate) VOP system 100, vehicle 2 including the same, and associated method, in which changes in load profiles and/or plug status of an outlet 110 may prompt vehicle alert responses that lead to minimizing and/or eliminating theft of power from the vehicle 2. Additionally, power may be provided to an outlet 110 of the vehicle 2 remotely from a mobile phone 302, thus allowing different loads to be powered remotely. A processor 120 of the vehicle 2 may also be programmed depending on desires of a user, as discussed above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle onboard power (VOP) system for a vehicle, the VOP system comprising:
   a power source;
   an outlet electrically connected to the power source;
   a processor electrically connected to the power source; and
   a memory comprising instructions that, when executed by the processor, cause the processor to perform operations comprising:
   determining the vehicle is in an OFF state;
   detecting a change in a load profile associated with the outlet while the vehicle is in the OFF state, wherein an ignition of the vehicle is off in the OFF state; and
   activating a vehicle alert response based on detecting the change in the load profile while the vehicle is in the OFF state.

2. The VOP system according to claim 1, wherein the vehicle alert response comprises wirelessly monitoring an environment surrounding the vehicle for a presence of a user device.

3. The VOP system according to claim 2, wherein the vehicle alert response further comprises sending a wireless alert notification to a mobile device in an absence of the presence of the user device being detected.

4. The VOP system according to claim 3, wherein the memory further comprises instructions that, when executed by the processor, cause the processor to perform operations comprising:
   receiving a shut off signal from the mobile device; and
   moving the power source from an ON state to the OFF state responsive to the shut off signal.

5. The VOP system according to claim 3, wherein the memory further comprises instructions that, when executed by the processor, cause the processor to perform operations comprising:
   determining a disregard signal has not been received from the mobile device within a predetermined amount of time; and
   moving the power source from the ON state to the OFF state.

6. The VOP system according to claim 3, further comprising a user interface connected to the processor and configured to receive an input to maintain the power source in an ON state when the presence of the user device is not detected.

7. The VOP system according to claim 3, wherein the change in the load profile is one of a detection of a first load being connected to the outlet or detection of a second load being disconnected from the outlet.

8. The VOP system according to claim 3, wherein the user device is one of a key fob, a second mobile device, or a card-as-a-key.

9. The VOP system according to claim 1, wherein activating the vehicle alert response comprises sending a wireless alert notification to a mobile device if the load profile has a value that exceeds a first predetermined power threshold or falls below a second predetermined power threshold.

10. The VOP system according to claim 1, wherein activating the vehicle alert response comprises either automatically moving the power source from an ON state to the OFF state upon detecting the change in the load profile, or automatically moving the power source from the ON state to the OFF state after a predetermined amount of time.

11. A vehicle comprising:
    an ignition; and
    a vehicle onboard power (VOP) system comprising:
    a power source coupled to the ignition;
    an outlet electrically connected to the power source;
    a processor electrically connected to the power source; and
    a memory comprising instructions that, when executed by the processor, cause the processor to perform operations comprising:
    determining the vehicle is in an OFF state;
    detecting a change in a load profile associated with the outlet while the vehicle is in the OFF state, wherein the ignition of the vehicle is off in the OFF state; and
    activating a vehicle alert response based on detecting the change in the load profile while the vehicle is in the OFF state.

12. The vehicle according to claim 11, wherein the ignition is configured to move between an ON state and the OFF state, and wherein the processor performs the operations comprising detecting the change in the load profile and activating the vehicle alert response with the ignition in the OFF state.

13. The vehicle according to claim 12, wherein the processor comprises a powertrain controller and a telematics controller electrically connected to the powertrain controller, wherein the powertrain controller is configured to move the power source between the ON state and the OFF state, and wherein the telematics controller is configured to wirelessly communicate with a mobile device.

14. The vehicle according to claim 12, wherein the vehicle further comprises a camera, an audio system, a horn, and lights each electrically connected to the processor, and wherein activating the vehicle alert response comprises employing at least one of the camera, the audio system, the horn, or the lights.

15. A method, comprising:
    determining, by a processor of a vehicle, that a vehicle is in an OFF state, the vehicle comprising an ignition, and vehicle onboard power (VOP) system comprising: a power source coupled to the ignition and an outlet electrically connected to the power source, wherein the ignition of the vehicle is off in the OFF state;
    detecting, by the processor, a change in a load profile associated with the outlet while the vehicle is in the OFF state;
    sending, by the processor, a wireless alert notification to a mobile device in absence of a presence of a user device based on detecting the change in the load profile while the vehicle is in the OFF state;

determining a disregard signal has not been received from the mobile device within a predetermined amount of time; and moving the power source from the ON state to the OFF state.

16. The method according to claim 15, wherein the ignition is configured to move between the ON state and the OFF state, and wherein the method further comprises moving the power source from the OFF state to the ON state with the ignition in the OFF state, responsive to a signal being sent to the processor from a mobile device in order to deliver power to the outlet.

17. The method according to claim 15, wherein the method comprises determining the vehicle is in the OFF state, detecting the change in the load profile, and activating a vehicle alert response based on the change in the load profile, and wherein the vehicle alert response comprises wirelessly monitoring an environment surrounding the vehicle for a presence of the user device.

18. The method according to claim 15, further comprising:

receiving a shut off signal from the mobile device; and moving the power source from the ON state to the OFF state responsive to the shut off signal.

\* \* \* \* \*